Figure 1:
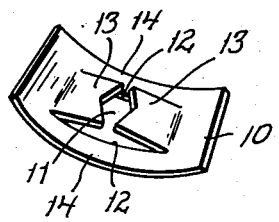

March 21, 1944.    G. A. TINNERMAN    2,344,570
FASTENER
Original Filed March 25, 1940

INVENTOR.
George A. Tinnerman,
BY Dales, Tears & McBean,
Attorneys.

Patented Mar. 21, 1944

2,344,570

UNITED STATES PATENT OFFICE 2,344,570

FASTENER

George A. Tinnerman, Cleveland, Ohio, assignor to Tinnerman Products, Inc., Cleveland, Ohio, a corporation of Ohio Original application March 25, 1940, Serial No. 325,857, now Patent No. 2,326,579, dated August 10, 1943. Divided and this application December 30, 1942, Serial No. 470,548

3 Claims. (Cl. 85—36)

This invention relates to an improvement in various fastening installations where it is desired to secure an object on a support, the under or distant surface of which is concave. My invention provides a very simple fastening clip having a seating surface singly curved in conformity with the under surface of the support and a pair of opposed tongues partially severed from the fastener and diverted into the space at the concave side of the base, with the result that a screw or stud carried by the object or projecting through it and through the support may at once be engaged on opposite sides by the tongues which act as struts and transmit the stresses to the base of the fastener and thence to a considerable area of the supporting member.

The base of my fastener is a comparatively thin metal strip which is singly curved into an arc and the tongues are made by a transverse opening through the base and a pair of slits parallel with each other extending in the direction of the length of the base. The two tongues thus left attached to the base adjacent its ends are bent beyond the plane connecting the anchorage regions. Their extreme ends, which are notched by the original opening through the strip, thus engage the stud beyond such plane normal to the axis of the stud and act as struts in compression as they are tightened on the stud.

By reason of there being only two tongues on the strip directly opposite each other and extending longitudinally, the strip may be a comparatively narrow parallel-sided member and still have ample body forming effective bridges from one tongue to the other, so that the anchorages of the tongues are not only held against spreading, but the compressive stresses are delivered along the bridges as well as at the end portions of the base and are thus well distributed over a comparatively large area of the support.

The invention enables the application of objects of various shapes to the exterior of a singly curved surface by which reason of such curvature presents difficulties in tightly securing of the stud. By distributing the stress over the entire base of the fastener, I am able to clamp objects to comparatively fragile supports without danger of breaking or injuring the support, as might happen with an ordinary nut, the bearing stress of which would be concentrated at the edge of the nut.

My invention is illustrated in the drawing hereof and is hereinafter more fully described.

Figure 2:
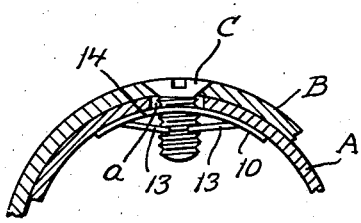

In the drawing, Fig. 1 is a perspective of the fastener; Fig. 2 is a section through a cylindrical or other singly curved support and a member mounted thereon by means of a screw and my fastener, the fastener itself being shown in edge elevation.

In each of the figures, 10 indicates the base of the fastener which is made by bending a flat metal strip into an arcuate form. An approximately diamond shaped opening 11 is made in the central region of the strip and a pair of parallel slits 12 cut through the strip in a longitudinal direction crossing and merging with the ends of the transverse opening 11. This leaves two tongues 13 with notched edges, which are firmly anchored to the base at their outer ends and are retained by the bridge portions 14 of the base. These tongues are bent toward the concave side of the base beyond the plane passing through the regions of attachment of the two tongues. If the fastening is to be used to engage a screw thread, the ends of the tongues are warped in opposite directions so that their edges define a turn of a helical thread.

In Fig. 2, A indicates a suitable support having a singly curved interior surface, that is a surface composed of parallel straight lines succeeding each other in an arc; B designates an object adapted to rest against the support and having an opening through it; and C a screw passing through the opening in the object and through a registering opening $a$ in the support, and into engagement with the fastener which lies against the interior surface of the support. As shown the head of the screw C is conical and in such case the opening through the object may be countersunk to provide a nearly flush exterior when the screw is in place.

As shown in Fig. 2, both the support and the object are cylindrical on both their exterior and interior, which is a condition frequently occurring, but the particular surface with which my fastener is concerned is the interior surface of the support, and an important point is that the fastener engage such surface over a considerable area to distribute the stresses resulting from tightening the screw.

The present application is a division of my copending application, No. 325,857, filed March 25, 1940, for a Fastener.

I claim:

1. A fastener made of a strip of sheet material and having a singly curved base and tongues cut from the base and bent into the region at the concave side of the base beyond the plane connecting the roots of said tongues to the base, whereby the tongues act as struts when in engagement with a stud passing from the convex side of the fastener through the fastener and beyond the tongues.

2. A fastener comprising a singly curved strip of sheet material, the curvature extending lengthwise of the strip, and a pair of opposed tongues extending lengthwise of the strip and integrally attached thereto adjacent the ends of the strip, said tongues being on the concave side of the strip and having their ends spaced apart and notched, there being an opening through the cylindrical base of the strip through which a stud may pass into engagement with the tongues.

3. A fastener comprising a parallel-sided strip of sheet metal bent into an arcuate form, the curvature extending lengthwise of the strip, the strip surface being composed of straight parallel lines extending across its short dimension, a pair of longitudinal tongues partially severed from the curved base by slits therein parallel to the edges of the strip and by a transverse opening between the ends of the tongues, such tongues being bent to project from the inner surface of the strip in oppositely inclined directions to form struts when in engagement with a stud passing through the strip and engaging the free ends of the tongues.

GEORGE A. TINNERMAN.